US010766626B2

(12) United States Patent
Leon et al.

(10) Patent No.: US 10,766,626 B2
(45) Date of Patent: Sep. 8, 2020

(54) SINGLE-PIECE EXTENDED LAMINAR FLOW INLET LIPSKIN

(71) Applicant: The Boeing Company, Chicago, IL (US)

(72) Inventors: Luis Leon, Federal Way, WA (US); Michael Nill, Seattle, WA (US); Pradip K. Saha, Bellevue, WA (US); Carol S. Oliver, Marysville, WA (US); Ricole A. Johnson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 624 days.

(21) Appl. No.: 15/603,899

(22) Filed: May 24, 2017

(65) Prior Publication Data

US 2018/0339783 A1    Nov. 29, 2018

(51) Int. Cl.
| | |
|---|---|
| *B64D 29/00* | (2006.01) |
| *C22F 1/04* | (2006.01) |
| *C21D 1/18* | (2006.01) |
| *B64D 33/02* | (2006.01) |
| *F16B 5/08* | (2006.01) |
| *B23K 20/12* | (2006.01) |

(52) U.S. Cl.
CPC ............. *B64D 29/00* (2013.01); *B64D 33/02* (2013.01); *C21D 1/18* (2013.01); *C22F 1/04* (2013.01); *B23K 20/122* (2013.01); *F16B 5/08* (2013.01)

(58) Field of Classification Search
CPC ... C22F 1/04; C22F 1/183; C21D 1/18; B64D 29/00; B64D 33/02; F16B 5/08
See application file for complete search history.

(56) References Cited

U.S. PATENT DOCUMENTS

| | | | |
|---|---|---|---|
| 7,210,611 | B2 | 5/2007 | Sanders et al. |
| 7,967,240 | B2 | 6/2011 | Sanders et al. |
| 8,323,427 | B1 | 12/2012 | Slattery et al. |
| 9,090,950 | B2 | 7/2015 | Hales et al. |
| 2015/0314850 | A1 | 11/2015 | Lumbab et al. |

OTHER PUBLICATIONS

Kumbhar, N.T. "Friction Stir Welding of Al 6061 Alloy," Asian Journal of Experimental Sciences, vol. 22, No. 2, Jan. 1, 2008, pp. 63-74. available at: http:fjajesjournal.com/PDFs/08-2/6.%20Friction%20stir%20welding.pdf.
Humberto Mota De Siqueira, Rafael, et al., "Mechanical and microstructural characterization of laser-welded joints of 6013-T4 aluminum alloy", Journal of the Brazilian Society of Mechanical Sciences and Engineering, Apr. 24, 2014, pp. 1-9. DOI: 10.1007/s40430-014-0175-6.
Widener, Christian A., et al., "Evaluation of Post-Weld Heat Treatments to Restore the Corrosion Resistance of Friction Stir Welded Aluminum Alloy 7075-T73 vs. 7075-T6," Materials Science Forum, vols. 539-543, ISSN: 1662-9752, Jan. 1, 2007, pp. 3781-3788.
Ivanov, R., et al., "Friction Stir Welding of Al—Li AA2199: Parameters, Precipitates and Post Weld Heat Treatment," Advanced Materials Research, ISSN: 1662-8985, vol. 409, Nov. 1, 2011, pp. 853-858. DOI: 10.4028/www.scientific.net/AMR.409.853.
Rajesh, S. et al., "Influence of heat input/multiple passes and post weld heat treatment on strength/electrochemical characteristics of friction stir weld joint," Materials and Manufacturing Processes, vol. 32, No. 2, Jan. 13, 2017, pp. 156-164. DOI:10.1080/10426914.2017.1279310.
Materia Exhibitions B.V., "3D Metal Forming by Explosion at Prototyping 2015," Oct. 26, 2015, available at https://materia.nl/article/3d-metal-forming-by-explosion-at-prototyping-2015/.
Airbus, "3D metalforming," available at http://www.3dmetalforming.com/products/space-and-aerospace/airbus/, last accessed Feb. 15, 2017, pp. 1-2.
Van der Veen, S.O. et al., "High-energy hydroforming for the aerospace industry," American Institute of Aeronautics and Astronautics, 57th AIAA/ASCE/AHS/ASC Structures, Structural Dynamics, and Materials Conference, AIAA SciTech Forum, (AIAA 2016-0157), Jan. 4, 2016, pp. 1-8; available at http://dx.doi.org/10.2514/6.2016-0157.
Benedyk, J.C., "International Temper Designation Systems for Wrought Aluminum Alloys: Part II—Thermally Treated (T Temper) Aluminum Alloys," Light Metal Age, Aug. 1, 2010, pp. 16.-22.
3D Metalforming, "Technology—3D metalforming," available at https://www.3dmetalforming.com/technology, last accessed Feb. 15, 2017, pp. 1-2.
Sanders, D., et al., "Superplastically Formed Friction Stir Welded Tailored Aluminum and Titanium Blanks for Aerospace Applications," EuroSPF 2008, Sep. 1, 2008, Carcassonne, France, HAL Id: hal-00338221, pp. 1-10, available at: https://hal.archives-ouvertes.fr/hal-00338221.
Strohecker, D.E., et al., "Explosive Forming of Metals," to Office of the Director of Defense Research and Engineering, Defense Metals Information Center, Battelle Memorial Institute, DMIC Report 203, May 8, 1964, Columbus, Ohio, pp. 1-68, unclassified.
Yuan, S.J., et al., "Formability and microstructural stability of friction stir welded Al alloy tube during subsequent spinning and post weld heat treatment," Materials Science & Engineering A, vol. 558, Aug. 19, 2012, pp. 586-591, XP028938841.
Tech Briefs Media Group, N.N., "Custom Machines Create Engine Lip Skins on Boeing Aircraft," Dec. 1, 2016, XP055487595, Retrieved from the internet: URL:https://www.techbriefs.com/component/content/article/tb/features/application-briefs/26069; retrieved on Jun. 25, 2018, pp. 1-4.

(Continued)

*Primary Examiner* — Jessee R Roe
(74) *Attorney, Agent, or Firm* — Coats & Bennett, PLLC

(57) ABSTRACT

Methods are disclosed for forming metal workpieces made from a heat-treatable metal that has been shaped and tempered according to specified protocols that facilitate formation of large contoured unitary metal structures having welds that are retained in the finished structure, and finished metal structures made according to such methods.

20 Claims, 11 Drawing Sheets

(56) References Cited

OTHER PUBLICATIONS

European Patent Office Search Report for European Application No. 18173837 dated Jul. 6, 2018.
European Patent Office Communication pursuant to Article 94(3) EPC—Examination Report for European Application No. 18173837 dated Aug. 2, 2018.

SINGLE-PIECE EXTENDED LAMINAR FLOW INLET LIPSKIN

TECHNOLOGICAL FIELD

The present disclosure relates generally to the field of fabricating metal structures. More specifically, the present disclosure relates to manufacturing a metal structure or component comprising shaping the metal structure or component while in specified heat-treatment conditions, and introducing a friction stir weld into the metal structure or component with the friction stir weld being maintained in the finished component. Still more specifically, the present disclosure relates to the manufacture of components and assemblies used to make lipskins for aircraft engine nacelles.

BACKGROUND

Laminar flow is the smooth, uninterrupted flow of air over the contour of wings, fuselages, or other parts of an aircraft in flight. Laminar flow is most often found at the front of a streamlined body. If the smooth flow of air is interrupted, turbulence is created, which can result in drag acting on the body. Increases in deviation away from optimal laminar flow at aircraft surfaces can result in an increase in fuel consumption, and therefore a commensurate increase in cost of operation.

Many known aircraft engines, for example jet engines and turbofan jet engines are surrounded by an annular, barrel-shaped nacelle. At least some known nacelles include a lipskin at the leading edge, or inlet, of the nacelle. While some large structures have been formed in a unitary fashion to reduce transverse weld lines or other couplings that could impact laminar flow, such unitary forming processes (e.g. spin-forming, etc.) are time-consuming, expensive and difficult or impractical in terms of size limitations for producing spin-formed lipskins of a desired, large size. Further, spin-formed lipskins may exhibit undesirable waves or ripples that could adversely affect laminar flow, leading to undesirable turbulence, increased fuel consumption, and/or increased cost of operation.

In attempts to solve the potential restrictiveness of spin-forming or other processes, some known methods for lipskin construction for aircraft engine nacelles have included the introduction of friction stir welds during lipskin construction, followed by removal of the welds during shaping, finishing, and other manufacturing processes, and further followed by the introduction of additional coupling components and parts (e.g. doublers). However, additional processing steps are often time-consuming, and the addition of parts in an aircraft assembly is often undesirable due to the commensurate increase in weight, assembly complexity, manufacturing time, additional inspections, etc., all of which can increase the overall cost of operating and maintaining the aircraft.

SUMMARY

Aspects of the present disclosure are directed to methods for forming metal lipskins for engine nacelles and the lipskins and nacelles so formed, as well as structures comprising the nacelles that comprise the lipskins, where the introduction of at least one "fly away" weld (including without limitation, one friction stir weld), and forming processes of a metal lipskin occurs in specified conditions of the metal such that the "fly away" weld is maintained in the finished lipskin.

An aspect of the present disclosure is directed to a method for making a heat-treated structure formed of metal, the method comprising performing a first heat-treating process on a roughly-shaped metal workpiece in an annealed condition, to transition the roughly-shaped metal workpiece from an annealed condition to a first-hardened condition, with the roughly-shaped metal workpiece comprising at least one friction stir weld; forming the roughly-shaped metal workpiece into a shaped metal workpiece while the roughly-shaped metal workpiece is in the first-hardened condition, with the shaped metal workpiece comprising one of a near finally-shaped metal workpiece or a finally-shaped metal workpiece; and performing a second heat-treating process on the shaped workpiece to transition the shaped metal workpiece from the first-hardened condition to a second-hardened condition.

In another aspect, the step of forming the roughly-shaped metal workpiece into a shaped metal workpiece comprises using at least one forming process to shape the roughly-shaped metal workpiece into the shaped metal workpiece.

In a further aspect, the shaped metal workpiece is a near-finally-shaped metal workpiece, with a method further comprising forming the near-finally-shaped metal workpiece into the finally-shaped metal workpiece while the near-finally-shaped metal workpiece is in the second-hardened condition.

In another aspect, the shaped metal workpiece comprises a finally-shaped metal workpiece, with a method further comprising using a plurality of forming processes to shape the roughly-shaped metal workpiece into the finally-shaped metal workpiece.

In another aspect, the forming process includes a super-plastic forming process; a super-plastic/diffusion bond forming process; a form-die forming process; an explosion forming process and combinations thereof.

Another aspect of the disclosure is directed to a method for making a heat-treated structure formed of metal, the method comprising performing a first heat-treating process on a roughly-shaped metal workpiece to transition the roughly-shaped metal workpiece into a first hardened condition to produce a first-hardened metal workpiece, the roughly-shaped metal workpiece being in an annealed condition and comprising at least one friction stir weld; performing a second heat-treating process on the first-hardened metal workpiece to transition the first-hardened metal workpiece to a second-hardened condition to produce a second-hardened metal workpiece; forming the second-hardened metal workpiece into a shaped metal workpiece, said shaped metal workpiece being in one of a near-finally-shaped metal workpiece or a finally-shaped metal workpiece.

In a further aspect, the steps of performing the first heat-treating process and second heat-treating process further comprise performing at least one age-hardening process on the roughly-shaped metal workpiece in the first-hardened condition; and performing at least one age-hardening process on the shaped metal workpiece in the second-hardened condition, wherein the first-hardened condition comprises a first age-hardened condition and the second-hardened condition comprises a second age-hardened condition.

In another aspect, the shaped metal workpiece comprises a friction stir weld.

In a further aspect, the shaped metal workpiece comprises a near finally-shaped workpiece, the method further comprising forming the near finally-shaped metal workpiece into a finally-shaped metal workpiece while the near finally-shaped metal workpiece is in the second-hardened condition.

In a further aspect, the shaped metal workpiece comprises a near finally-shaped metal workpiece the method further comprises the step of using a plurality of forming processes to shape the near finally-shaped metal workpiece into the finally-shaped workpiece while the near finally-shaped metal workpiece is in the second-hardened condition.

In another aspect, the shaped metal workpiece comprises a near finally-shaped metal workpiece and further comprising the step of using at least one explosion forming process to shape the near finally-shaped metal workpiece into the finally-shaped workpiece while the near finally-shaped metal workpiece is in the second-hardened condition.

In a further aspect, before the step of performing a first heat-treating process on a roughly-shaped metal workpiece, further comprising forming a metal sheet into the roughly-shaped metal workpiece while the metal sheet is in the annealed condition.

In another aspect, the step of forming a metal sheet further comprises rolling the metal sheet into the roughly-shaped metal workpiece.

In yet another aspect, the step of forming a metal sheet further comprises forming the metal sheet, while the metal sheet is in the annealed condition; and using at least one forming process forming process to form the metal sheet, with the forming process including a super-plastic forming process; a super-plastic/diffusion bond forming process; a form-die forming process; an explosion forming process or combinations thereof.

In a further method, the step of forming a metal sheet into the roughly-shaped metal workpiece while the metal sheet is in the annealed condition further comprises forming the sheet into a conical or frusto-conical metal workpiece.

In a further aspect, the steps of performing the first heat-treating process and second heat-treating process further comprise performing at least one age-hardening process on the roughly-shaped metal workpiece in the first-hardened condition; and performing at least one age-hardening process on the on the shaped metal workpiece in the second-hardened condition; wherein the first-hardened condition comprises a first age-hardened condition, and the second-hardened condition comprises a second age-hardened condition.

In another aspect, the step of performing a first heat-treating process comprises performing a natural aging process on the roughly-shaped metal workpiece.

In a further aspect, the step of performing a first heat-treating process comprises solution heat-treating the metal and natural aging the roughly-shaped metal workpiece.

In another aspect, the step of performing a first heat-treating process, further comprising performing a T-4 heat-treating process on the roughly-shaped metal workpiece.

In another aspect, performing a second heat-treating process comprises performing an artificial aging process on the shaped metal workpiece.

In a further aspect, performing a second heat-treating process comprises performing a solution heat-treating process on the shaped metal workpiece; and performing an artificial aging process on the shaped metal workpiece.

In a further aspect, performing a second heat-treating process comprises performing a T-6 heat-treating process.

In yet another aspect, forming the roughly-shaped metal workpiece into a shaped workpiece comprises using at least one forming process selected from the group consisting of a super-plastic forming process; a super-plastic/diffusion bond forming process; a form-die forming process; and an explosion forming process to shape the roughly-shaped metal workpiece into the shaped workpiece.

In a further aspect, the shaped workpiece is a near-finally-shaped metal workpiece, the method further comprising forming the near-finally-shaped metal workpiece into a finally-shaped metal workpiece while the near-finally-shaped metal workpiece is in the second-hardened condition.

In a further aspect, the shaped metal workpiece is a finally-shaped metal workpiece and further comprising forming the roughly-shaped metal workpiece into a finally-shaped metal workpiece using at least one forming process including a super-plastic forming process; a super-plastic/diffusion bond forming process; a form-die forming process; an explosion forming process and combinations thereof.

A further aspect of the present disclosure is directed to a metal structure formed according to any of the aforementioned methods.

In a further aspect, the metal comprises aluminum or an aluminum alloy.

In another aspect, the metal structure is annularly-shaped.

In a further aspect, the metal structure is a lipskin for use in an engine nacelle assembly.

In another aspect, the metal structure is a heat-treated structure in the second-hardened condition.

According to another aspect, the present disclosure is further directed to a metal structure for use on an aircraft comprising a metal that has been heat-treated, with the metal structure comprising at least one friction stir weld.

A further aspect of the present disclosure is directed to a nacelle assembly for use on an aircraft, the assembly comprising a lipskin made from a metal that has been heat-treated, with the lipskin comprising at least one friction stir weld.

A further aspect of the present application is directed to structures comprising the lipskin made from a metal that has been heat-treated, with the lipskin comprising at least one friction stir weld, the structures including, without limitation, manned and unmanned aircraft, manned and unmanned rotorcraft, manned and unmanned spacecraft, manned and unmanned terrestrial vehicles, manned and unmanned surface water borne vehicles, manned and unmanned subsurface waterborne vehicles, rockets, missiles, etc.

BRIEF DESCRIPTION OF THE DRAWINGS

Figure 1:
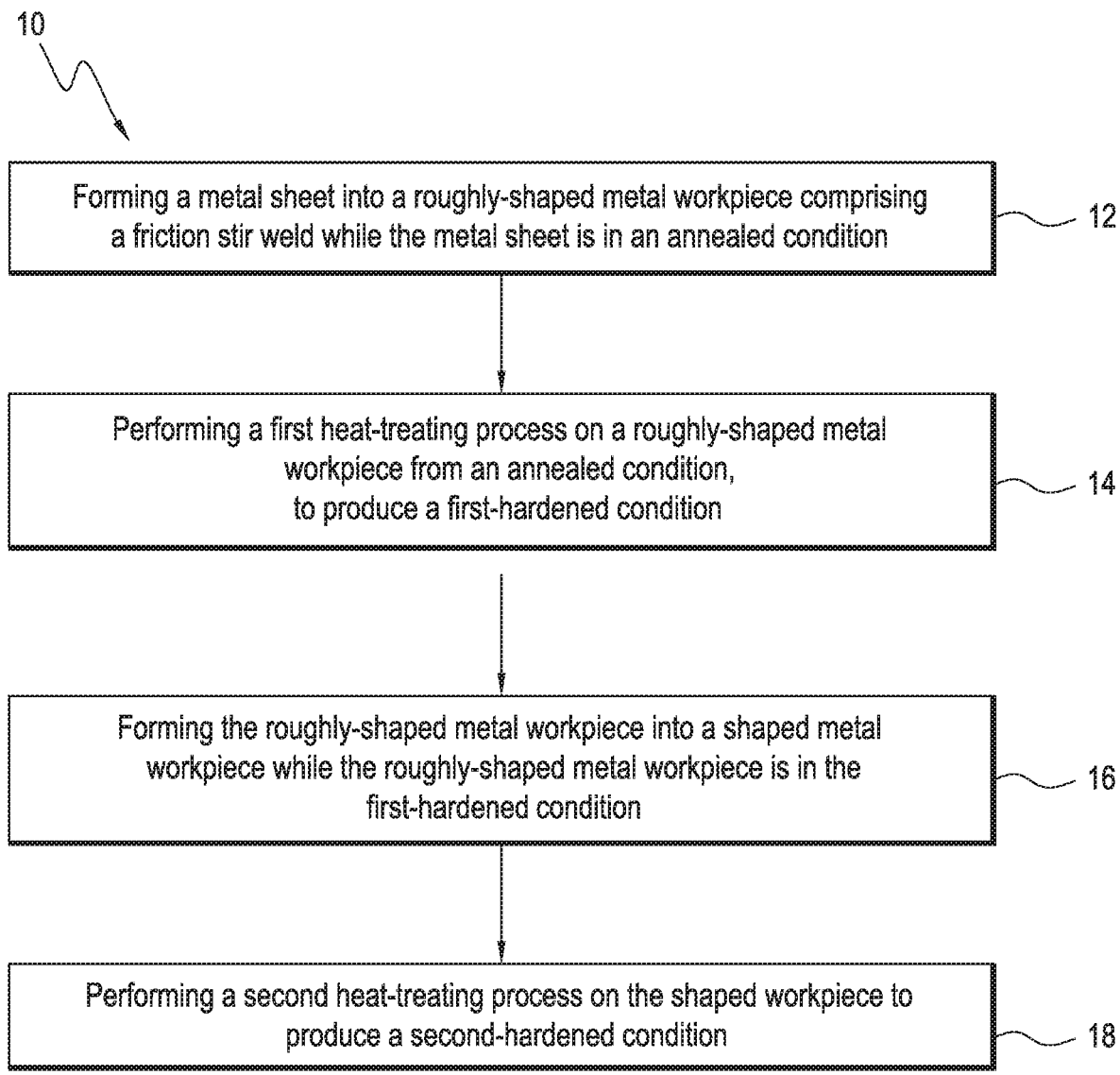
Figure 2:
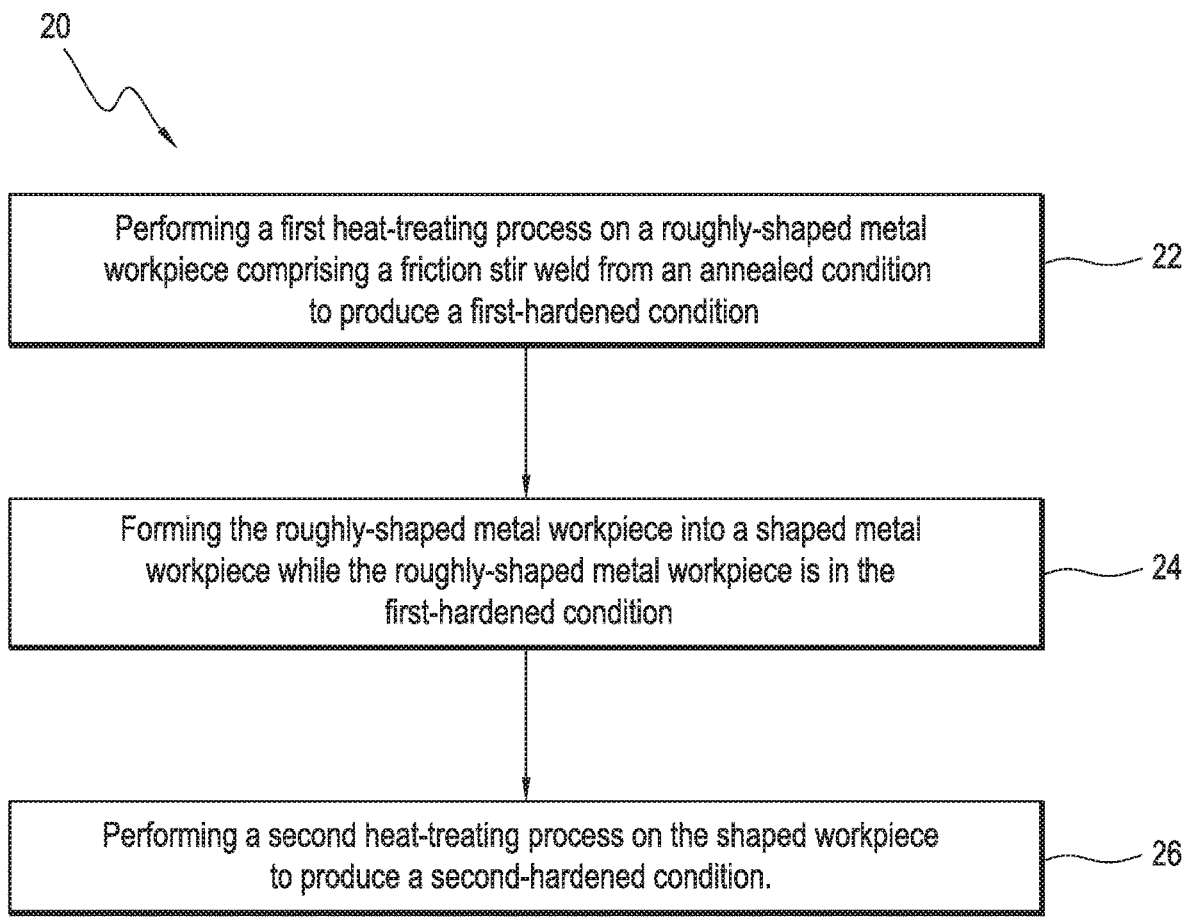
Figure 3:
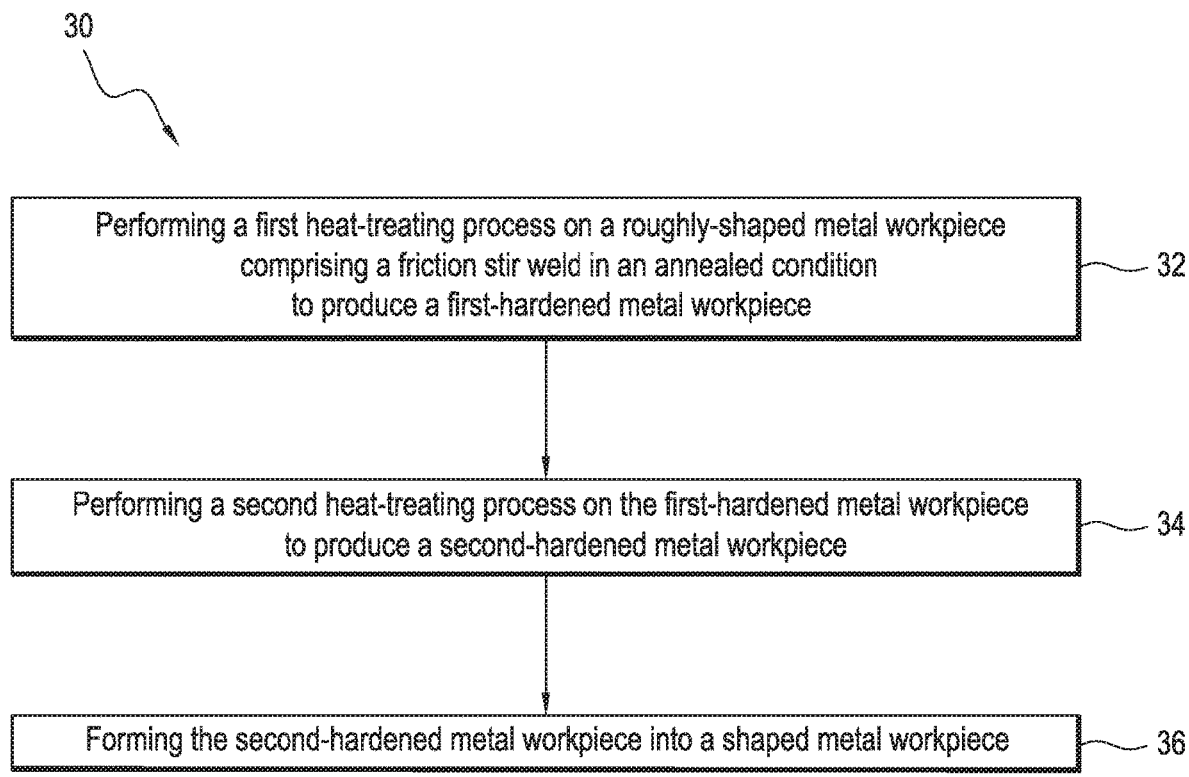
Figure 4:
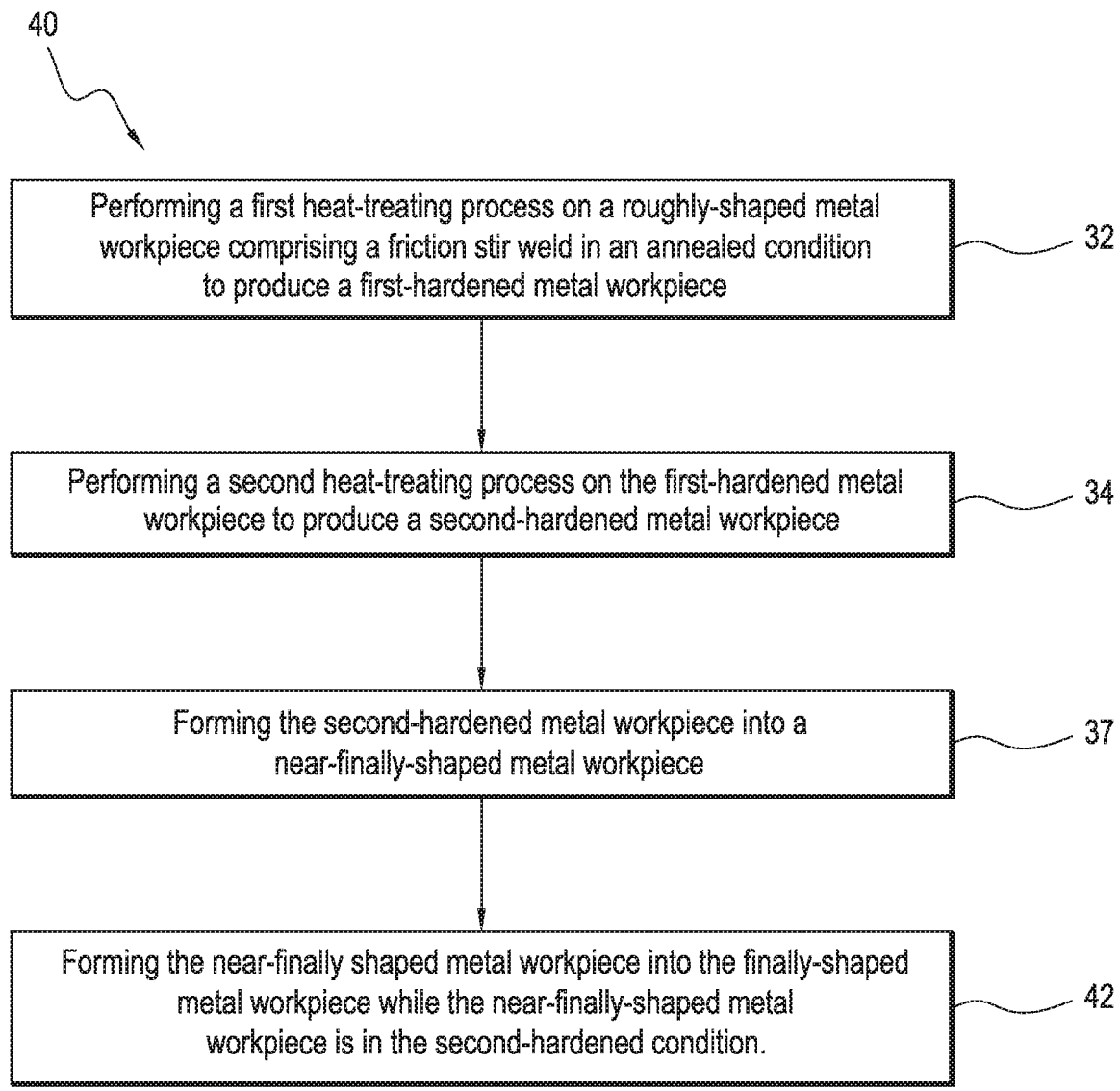
Figure 5:
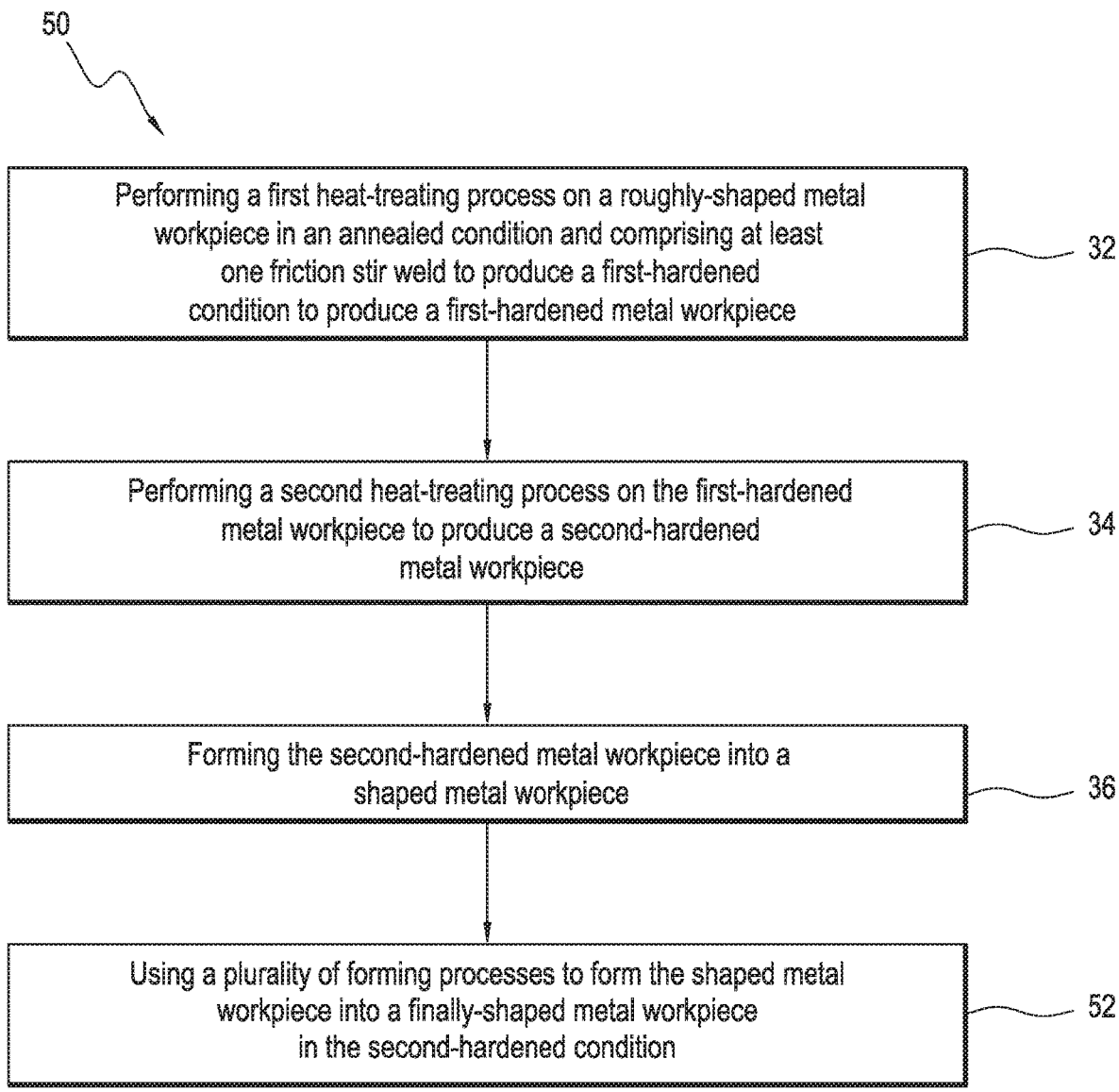
Figure 6:
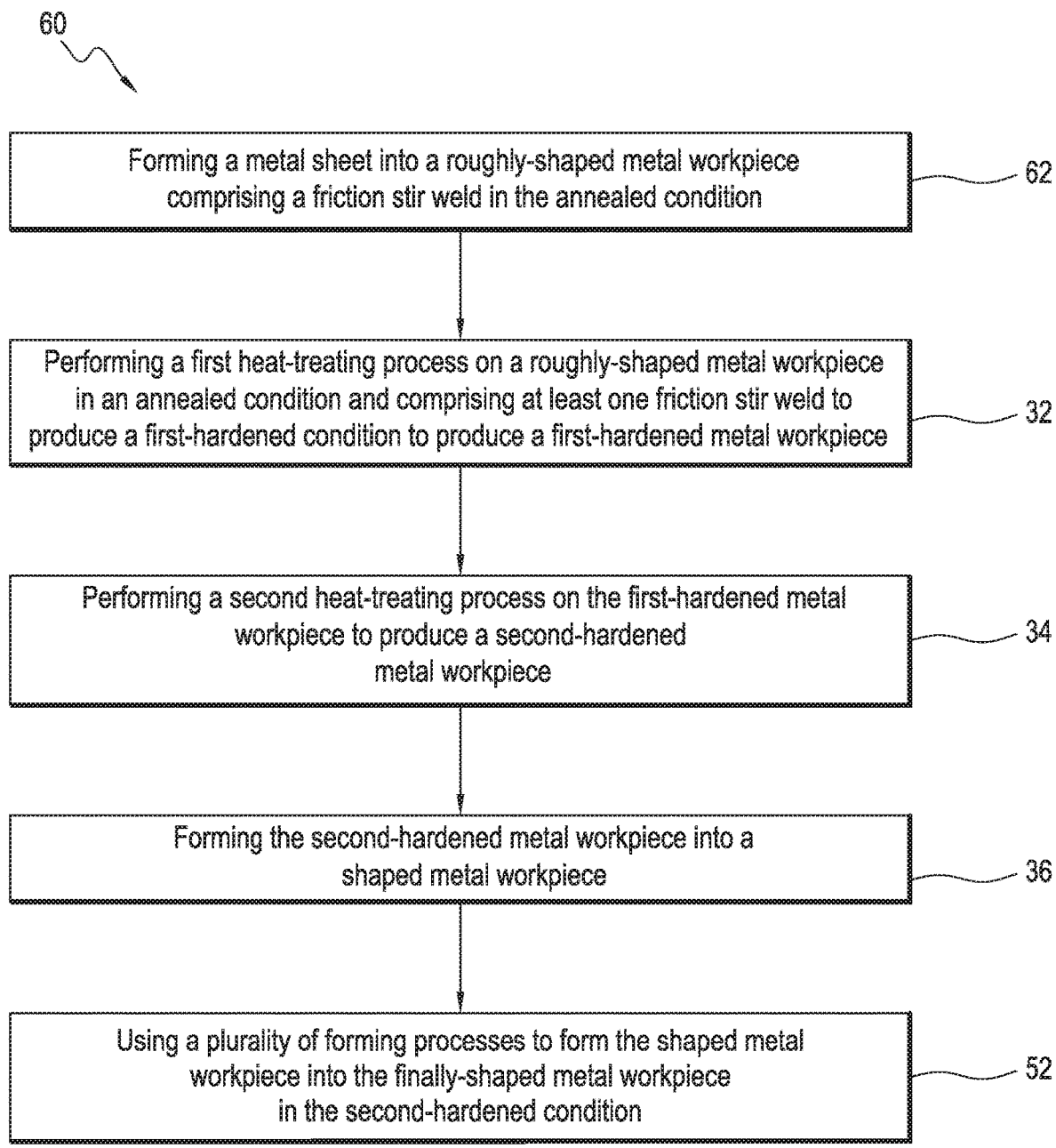
Figure 7:
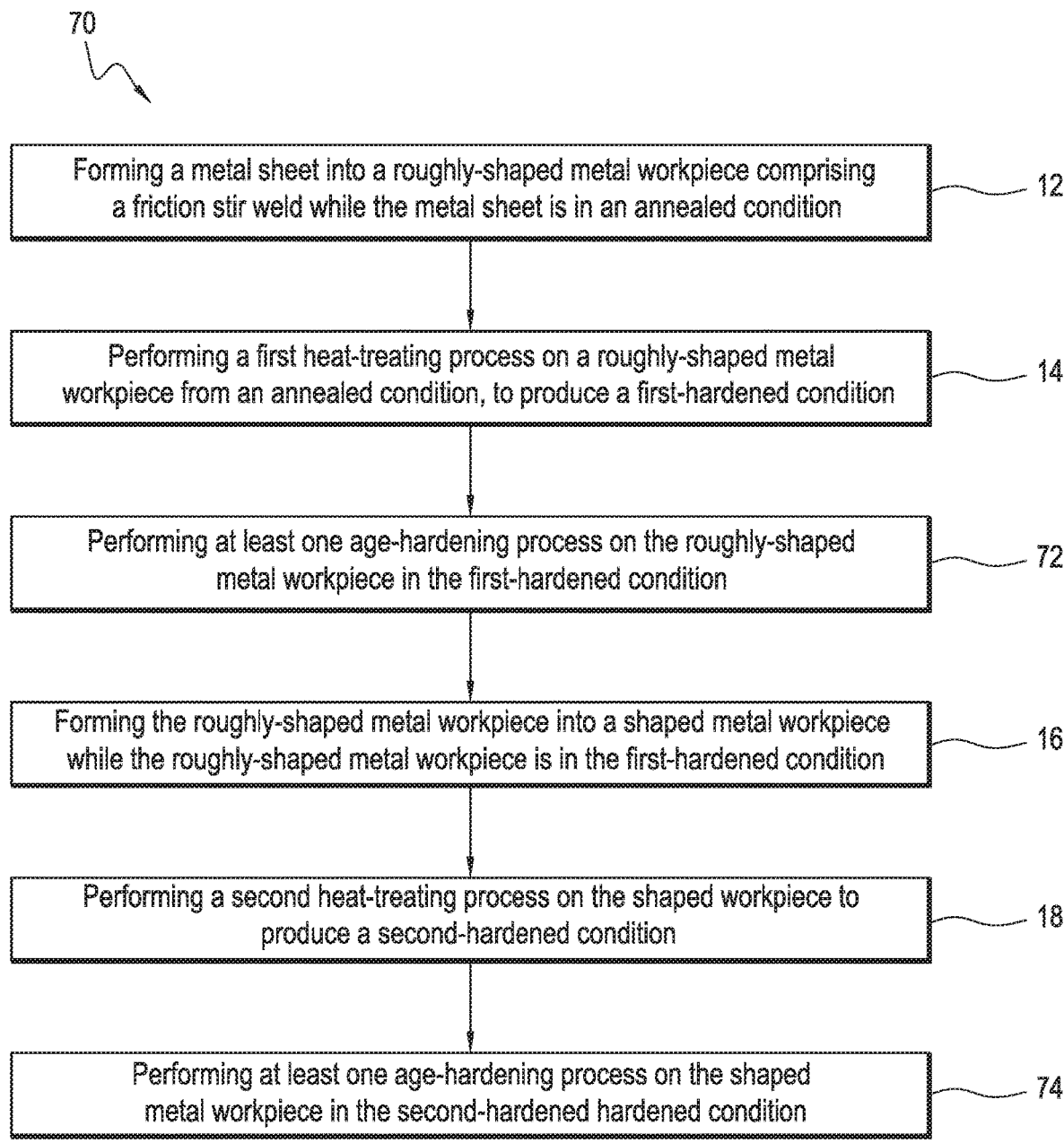
Figure 8A:
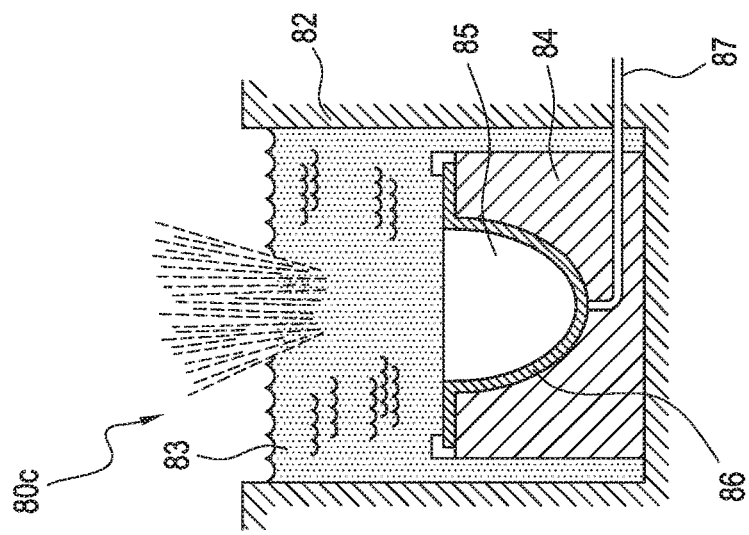
Figure 8B:
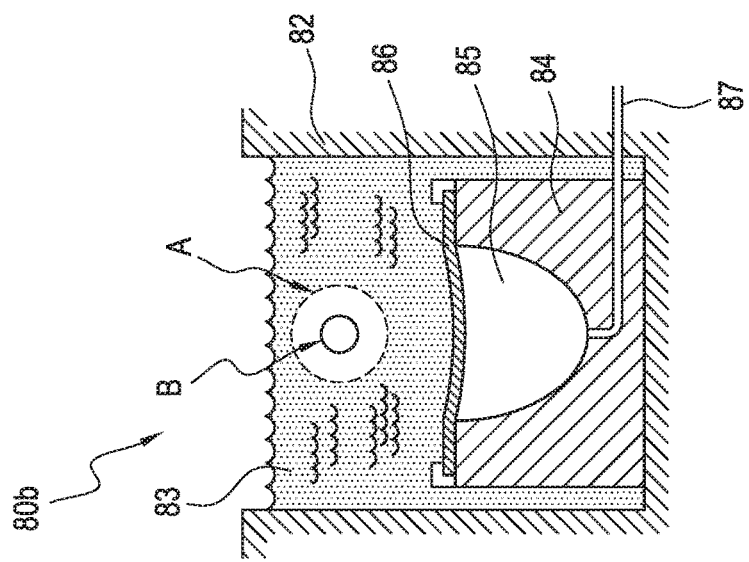
Figure 8C:
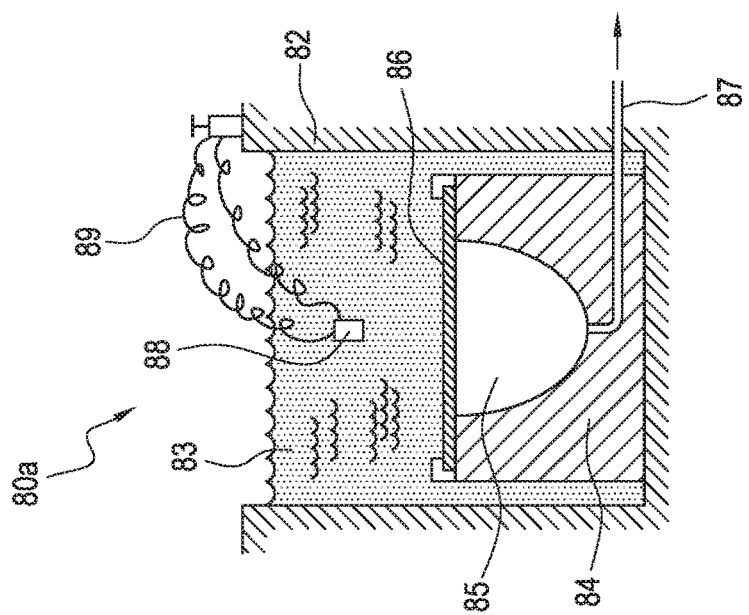
Figure 9:
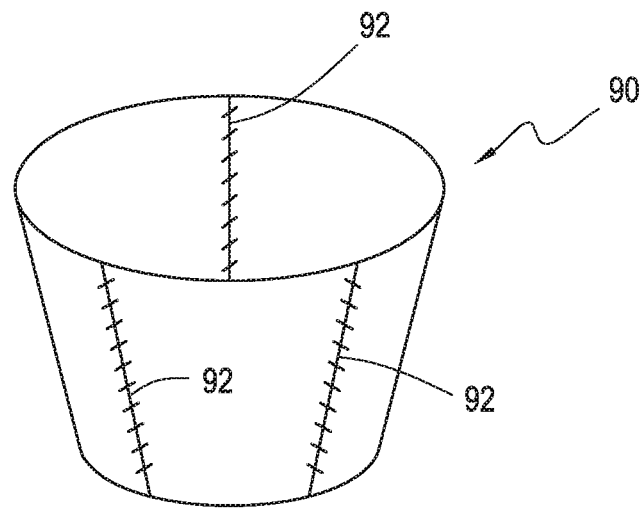
Figure 10:
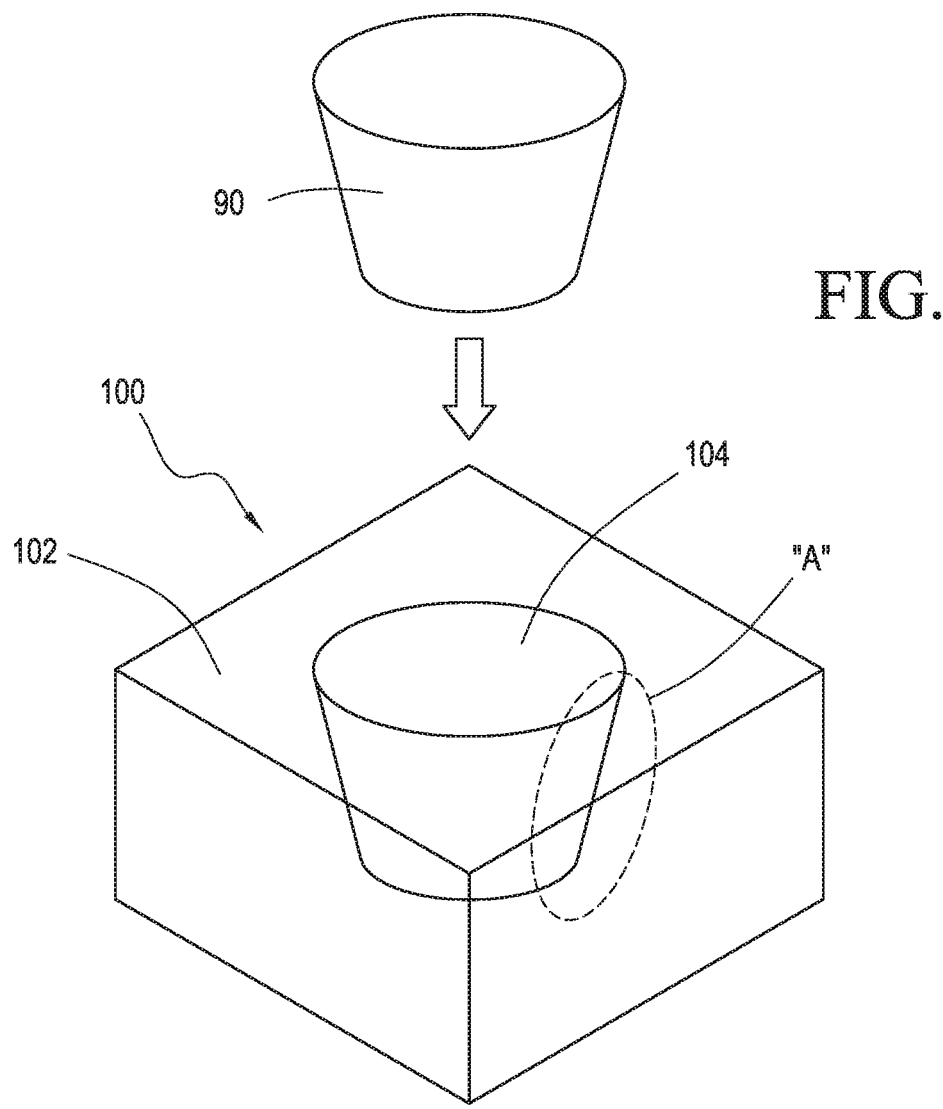
Figure 12:
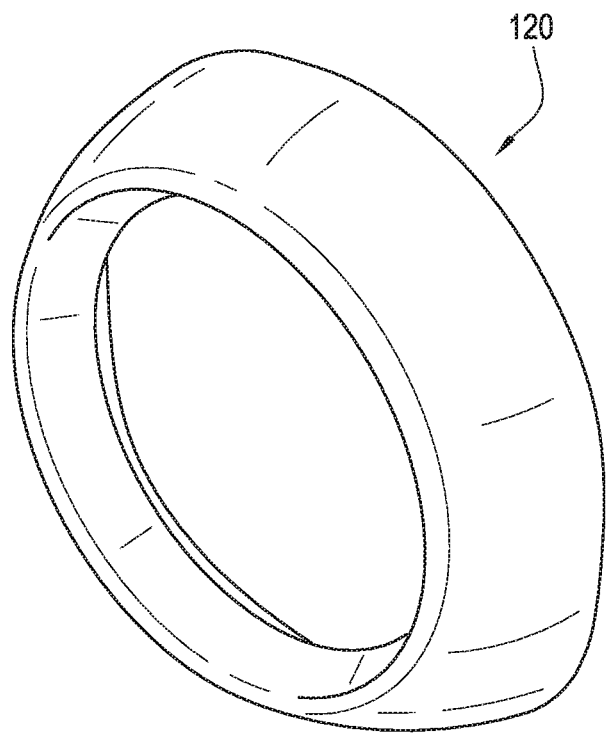
Figure 13:
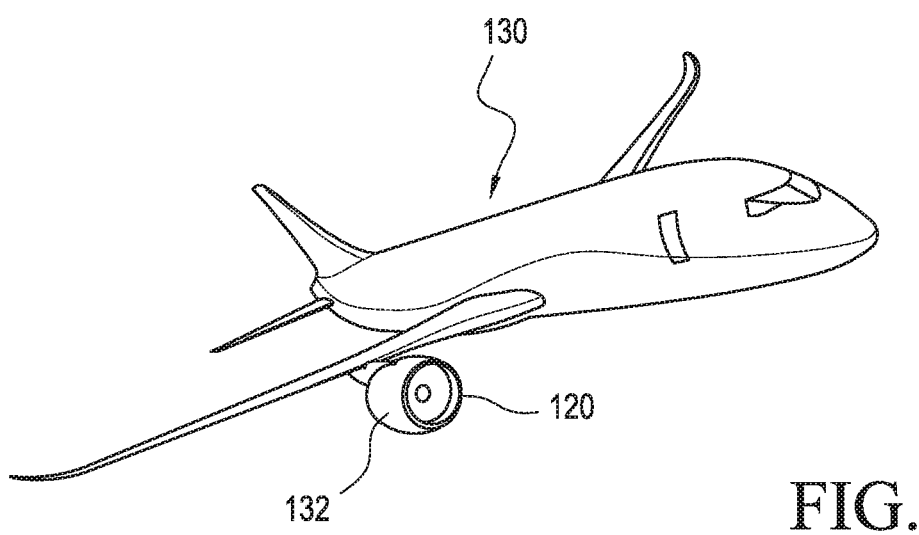

Having thus described variations of the disclosure in general terms, reference will now be made to the accompanying drawings, which are not necessarily drawn to scale, and wherein:

FIG. 1 is a flowchart illustrating an exemplary forming method of the present disclosure;

FIG. 2 is a flowchart illustrating an exemplary method of the present disclosure;

FIG. 3 is a flowchart illustrating an exemplary method of the present disclosure;

FIG. 4 is a flowchart illustrating an exemplary method of the present disclosure;

FIG. 5 is a flowchart illustrating an exemplary method of the present disclosure;

FIG. 6 is a flowchart illustrating an exemplary method of the present disclosure;

FIG. 7 is a flowchart illustrating an exemplary method of the present disclosure;

FIGS. 8A, 8B and 8C are cross-sectional side-views of a workpiece progressing through stages of a forming process from a rough-shaped metal workpiece into a shaped, near-finally shaped and finally-shaped metal workpiece, according to aspects of the present disclosure;

FIG. 9 is a perspective view of a roughly-shaped metal workpiece in a frusto-conical orientation;

FIG. 10 is a perspective view of a roughly-shaped metal workpiece being oriented into a forming block of a forming process, according to aspects of the present disclosure;

FIGS. 11A, 11B, 11C, 11D, and 11E are cross sectional side views of forming blocks in a forming process used to transform a roughly-shaped metal workpiece into a near-finally-shaped and finally-shaped metal workpiece;

FIG. 12 is a perspective view of a final-shaped metal workpiece as lipskin for an nacelle made according to aspects of the present disclosure; and FIG. 13 is a perspective view of an aircraft comprising an engine nacelle.

DETAILED DESCRIPTION

Methods for constructing unitary, or single-piece, aircraft engine lipskins that can provide improved laminar flow are disclosed herein. The methods and apparatuses disclosed herein provide a lightweight, efficient, reproducible and high-performance engine nacelle lipskin made from a heat-treatable metal that has been shaped and tempered according to specified protocols that facilitate unitary formation of a large contoured metal structure without requiring introduction of additional components to structurally reinforce areas of the unitary structure where welds occur. That is, in the structures and methods according to aspects of the present application, the welds made in the structures are retained in the finished structure.

Retention of the welds in structures used in aircraft (e.g. lipskins on aircraft nacelle assemblies) allows such welds to be so-called "fly away" welds that are retained in the finished structure. Without being bound to any particular theory, the shaping of the metals used to make the lipskins, according to aspects of the present disclosure, is predominantly conducted and accomplished while the metal is in the annealed condition. The order of shaping in the annealed condition can allow for weld retention in a finished product due to internal metal stresses being managed in a predetermined way that obviates the need to remove such welds and introduce additional reinforcing components that would complicate the manufacturing process and add weight to a structure comprising the lipskin.

For the purposes of the present disclosure, "heat-treatable metals" refer to heat-treatable metals that include aluminum and the 2000-, 4000-, 6000-, and 7000-series aluminum alloys.

According to aspects of the present disclosure, a metal workpiece in the annealed state can be formed into a roughly-shaped metal workpiece by being subjected to at least one forming process. For the purpose of the present disclosure, super-plastic processes, super-plastic/diffusion bond processes, form-die processes, and explosive-forming processes are examples of a forming process and may be equivalently and interchangeably referred to as "forming processes".

Explosive-forming processes may be equivalently and interchangeably referred to as "explosion-molding", "explosive molding", "explosion-forming" or "high-energy hydro-forming" (HEHF) processes. An explosive-forming process is a metalworking process where an explosive charge is used to supply the compressive force (e.g. a shockwave) to a metal workpiece against a form (e.g. a mold) otherwise referred to as a "die". Explosive-forming is typically conducted on materials and structures of a size too large for forming such structures using a punch or press to accomplish the required compressive force. According to one explosive-forming approach, a metal workpiece, up to several inches thick, is placed over or proximate to a die, with the intervening space, or cavity, optionally evacuated by a vacuum pump. The entire apparatus is submerged into an underwater basin or tank, with a charge having a predetermined force potential detonated at a predetermined distance from the metal workpiece to generate a predetermined shockwave in the water. The water then exerts a predetermined dynamic pressure on the workpiece against the die at a rate on the order of milliseconds. The die can be made from any material of suitable strength to withstand the force of the detonated charge such as, for example, concrete, ductile iron, etc. The tooling should have higher yield strength than the metal workpiece being formed.

Explosive forming processes are sometimes divided into two groups, depending upon the position of the explosive charge relative to the workpiece. According to the "stand off" method, a workpiece is placed over a die with the intervening space evacuated by a vacuum, with the entire assembly immersed under water, preferably in a basin or tank. The explosive material is then placed at a predetermined distance from the assembly and detonated. According to the "contact method", an explosive charge is placed in direct contact with the workpiece and the detonation produces interface pressures on the workpiece surface up to several million pounds per square inch (psi).

Superplastic forming is a forming process that typically uses high temperature and gas pressure to form particular materials onto a single step mold. Superplastic forming can create very detailed metal parts including aluminum and titanium. Superplasticity is the ability of a material to experience extremely high elongations on the order of 200% or more. For a material to elicit superplastic behavior, there are typical criteria including, for example, an extremely fine grain size (a few micrometers or less), with generally uniform and equiaxed grain structure; high temperatures (usually on the order of half the melting temperature); low strain rates (e.g. on order of $10^{-2}$/seconds or lower).

Friction stir welding (FSW) refers to a process for the solid-state joining of two workpieces using a non-consumable tool without melting the material of the workpiece(s). Heat is generated by friction between a rotating tool and the workpiece, resulting in a softened region proximate to the FSW tool. As the FSW tool proceeds along a desired joining line, the tool mechanically intermixes the material of the workpieces to be joined. In this way, hot and softened metal of the workpieces is forged by the mechanical pressure that is applied by the FSW tool, resulting in a solid state deformation of dynamic recrystallization of the workpiece materials without melting the workpieces. While aspects of the present disclosure describe producing and retaining friction stir welds in the metals used, the present disclosure contemplates, without limitation, any type of welds can be "fly-away welds". As explained above, "fly-away welds" refer to welds in components and parts that remain in the part or component as used in flight. In other words, "fly-away welds" are retained in the finished structures as opposed to being removed from the structures before use.

According to the present disclosure, a heat-treated structure is a structure, preferably a metal structure, that is exposed to heat-treating. Heat-treating for metals (especially metal alloys) manipulates the properties of the metal by controlling rates of diffusion and the rate of cooling within a metal's microstructure. Heat-treating predictably alters the mechanical properties of a metal, manipulating properties including hardness, strength, ductility, elasticity, etc. The present specification discloses first heat-treating processes and second heat-treating processes to achieve metal workpieces having a particular "state" or heat-treatment "condition". According to the present disclosure, for aluminum alloys, the heat-treatment conditions include an annealed condition, a first-hardened condition, and a second-hardened condition.

For aluminum alloys, the annealed condition is used to describe alloys used for sheet workpieces made by some shaping processes. The annealed condition is the lowest strength condition for a metal alloy workpiece. Annealing is a heat treatment that alters the physical properties of a material to increase ductility and reduce hardness, making the material more "workable". In annealing, atoms migrate in a material's crystalline lattice, with the number of dislocations decreasing, leading to a change in ductility and hardness. A dislocation refers to the primarily linear defects present throughout a material's crystalline structure and the internal stresses caused thereby. Annealing conditions for aluminum alloys vary according to individual aluminum alloys, but generally require exposing the aluminum alloy to a temperature of from about 650° F. (343.3° C.) to about 770° F. (410° C.) for 2 to 3 hours, followed by slow cooling to about 500° F. (260° C.) followed by uncontrolled cooling rates to room temperature. Specific temperatures, times, cooling rates, etc. can differ from the examples above, depending upon which metal (e.g. aluminum alloy) is being treated.

The "T" temper designation for heat-treated (e.g. heat-treatable) aluminum and aluminum alloys includes a number that indicates a basic type of treatment. Of particular interest for the present disclosure are the T4 and T6 conditions. As used herein, the T4 condition is an example of a "first-hardened condition". A T4 condition indicates that the T4 treated alloy has incurred a solution heat treatment and, has naturally aged to a stable condition. As used herein, the T6 condition is an example of a "second-hardened condition". A T6 condition indicates that the T6 treated alloy has been solution heat treated and, without any significant cold working, has been artificially aged to achieve additional precipitation hardening to become stable metallurgically.

According to an aspect of the present disclosure, an aluminum alloy may be provided in the annealed condition as a sheet of material (i.e., the "O" condition) with either partial or full anneal cycles intermittently conducted on the aluminum alloy. The annealed aluminum alloy is brought to the first-hardened condition, such as the T4 condition, via a solution heat treatment, and bringing the aluminum alloy sheet to a temperature above 900° F. (482.2° C.) for a time that is dependent on the particular alloy and the thickness of the sheet) followed by quenching in water or glycol. The aluminum alloys selected are precipitation age-hardenable, allowing the alloys to naturally age at room temperature. If desired, the aging in the T4 condition may be tailored by placing the alloy in the T4 condition in dry ice or in a freezer. The alloy sheet in the first-hardened condition (e.g., the T4 condition) may then be formed into a roughly-shaped metal workpiece that includes introducing at least one friction stir weld introduced in the annealed condition to shape the metal workpiece as desired. According to a contemplated aspect, in the case of forming lipskins for aircraft engine nacelles, the alloy in the annealed condition is shaped and friction stir welded to a roughly-shaped metal workpiece, and then the alloy in the first-hardened condition is shaped or to a near-finally-shaped metal workpiece or finally-shaped workpiece.

According to aspects of the present disclosure, during the first-hardened process, the alloy is subjected to at least one forming process that includes, for example, an explosive forming process, to create the near-finally-shaped metal workpiece or the finally-shaped metal workpiece. According to contemplated aspects, most of the forming of the aluminum alloy into the near-finally-shaped metal workpiece is conducted with the alloy in the first-hardened condition (e.g., the T4 condition). The near-finally-shaped metal workpiece is then brought to a second-hardened condition (i.e. T6 condition) by artificially aging the metal workpiece. For example, for aluminum alloy Al-2219, the cycle time and temperature is 375° F. (190.5° C.) for 36 hours.

FIGS. 1-7 are flowcharts describing aspects of the present disclosure. Consistent with particular aspects of the present disclosure, FIG. 1 is directed to a method 10 for making a heat-treated structure formed of metal. The method 10 includes forming 12 a metal sheet into a roughly-shaped metal workpiece having a friction stir weld while the metal sheet is in an annealed condition. One example of the roughly-shaped metal workpiece is the metal workpiece 90 having at least one friction stir weld 92 as shown in FIG. 9, which is described in more detail below.

Method 10 includes step 12 performed in a manner consistent with aspects of the present disclosure using forming processes such as rolling or other physical shaping means suitable to physically transform and shape a metal from a first, or initial, orientation to a subsequent orientation. Further forming processes to transform metal to a roughly-shaped metal workpiece, as contemplated by aspects of the present disclosure, may take place in step 12 including subjecting the metal sheet to super-plastic processes, super-plastic/diffusion bond processes, form-die processes, explosive-forming processes, and combinations thereof. The roughly-shaped state of the metal workpiece, according to aspects of the present disclosure, therefore contemplates the state of the metal work-piece between the initial form of a metal (e.g., a metal sheet that may be substantially planar) and a shaped (i.e., near-finally-shaped, or finally-shaped) metal workpiece that has been subjected to subsequent forming processes after attaining the roughly-shaped metal workpiece.

The method 10 further includes performing 14 a first heating-treating process on the roughly-shaped metal workpiece to transition the roughly-shaped metal workpiece from an annealed condition to a first-hardened condition. The roughly-shaped metal workpiece includes the at least one friction stir weld (e.g. friction stir weld 92 shown in FIG. 9). When the metal workpiece is aluminum or an aluminum alloy, the first-hardened condition is the T4 condition. The method 10 includes forming 16 the roughly-shaped metal workpiece into a shaped metal workpiece while the roughly-shaped metal workpiece is in the first-hardened condition. An example of the shaped metal workpiece is the metal workpiece 114b, 114c, 114d, 114e and 120 as shown in FIG. 9 and FIGS. 11B, 11C, 11D, 11E and FIG. 12, which is described in more detail below. According to aspects of the present disclosure, the shaped metal workpiece retain and includes the friction stir weld 92 introduced to the roughly-shaped metal workpiece as shown in FIG. 9. The shaped metal workpiece comprises one of a near finally-shaped metal workpiece or a finally-shaped metal workpiece.

According to aspects of the present disclosure, method 10 includes forming 16 processes used to transform a roughly-shaped metal workpiece into the shaped (i.e. near-finally-shaped or finally-shaped) metal workpieces include subjecting the metal sheet to super-plastic processes, super-plastic/ diffusion bond processes, form-die processes, explosive-forming processes, and combinations thereof. When an explosive-forming process is used in step 16, the explosive-forming process also includes the quenching step of the first heat-treating process.

Aspects of the method 10 include performing 18 a second heat-treating process on the shaped workpiece to transition the shaped metal workpiece from the first-hardened condition to produce a second-hardened condition. When the metal workpiece is aluminum or an aluminum alloy, the second-hardened condition is a T6 condition. At least one forming process can be performed while the metal is in the second-hardened condition. However, all of the forming processes on the roughly-shaped workpiece (e.g., forming the roughly-shaped metal workpiece into the shaped metal workpiece) may be completed while the metal is in the first-hardened condition.

Consistent with particular aspects of the present disclosure, FIG. 2 is directed to a method 20 for making a heat-treated structure formed of metal. The method described in FIG. 2 is similar to the method outlined in FIG. 1, except the method 20 contemplates starting with a roughly-shaped metal workpiece rather than, for example, a flat sheet of metal. The method 20 includes performing 22 a first heat-treating process on a roughly-shaped metal workpiece in an annealed condition to transition the roughly-shaped metal workpiece from an annealed condition to a first-hardened condition, with the roughly-shaped metal workpiece comprising at least one friction stir weld introduced to the metal workpiece in the annealed condition. One example of the roughly-shaped metal workpiece is the metal workpiece 90 having at least one friction stir weld 92 as shown in FIG. 9, which is described in more detail below. The first-hardened condition of the metal is in the T4 condition when the metal workpiece is aluminum or an aluminum alloy.

The method 20 further includes forming 24 the roughly-shaped metal workpiece into a shaped metal workpiece while the roughly-shaped metal workpiece is in the first-hardened condition, with the shaped metal workpiece being one of a near finally-shaped metal workpiece or a finally-shaped metal workpiece. According to aspects of the present disclosure, the forming process(es) 24 used to transform a roughly-shaped metal workpiece into the shaped (i.e., near-finally-shaped or finally-shaped) metal workpiece includes subjecting the roughly-shaped metal workpiece to at least one forming process that includes super-plastic processes, super-plastic/diffusion bond processes, form-die processes, explosive-forming processes, and combinations thereof. An example of the shaped metal workpiece is the metal workpiece 114*b*, 114*c*, 114*d*, 114*e* and 120, as shown in FIGS. 11B, 11C, 11D, 11E and FIG. 12, and which is described in more detail below. According to aspects of the present disclosure, the shaped metal workpiece retains and includes the friction stir weld 92 introduced to the roughly-shaped metal workpiece as shown in FIG. 9. When an explosive-forming process is used in step 24, the explosive-forming process also includes the quenching step of the first heat-treating process.

The method 20 further includes performing 26 a second heat-treating process on the shaped workpiece to transition the shaped metal workpiece from the first-hardened condition to produce a second-hardened condition. When the metal workpiece is aluminum or an aluminum alloy, the second-hardened condition is the T6 condition. At least one forming process can be performed while the metal is in the second-hardened condition. However, as contemplated by method 20, all of the forming processes on the roughly shaped metal workpiece (e.g. forming the roughly-shaped metal workpiece into the shaped metal workpiece) may be completed while the metal is in the first-hardened condition.

Consistent with particular aspects of the present disclosure, FIG. 3 is directed to a method 30 for making a heat-treated structure formed of metal. Whereas FIGS. 1 and 2 outline methods, 10 and 20 respectively, where the roughly-shaped metal workpiece is formed into a shaped metal workpiece in the first-hardened condition, as shown in FIG. 3, a method 30 is further defined such that at least some forming of the metal workpiece into the shaped metal workpiece occurs after the metal workpiece is in the second-hardened condition. The method 30 includes performing 32 a first heat-treating process on a roughly-shaped metal workpiece in an annealed condition (with the workpiece in an annealed condition including at least one friction stir weld) to transition the roughly-shaped metal workpiece into a first-hardened condition to produce a first-hardened metal workpiece. One example of the roughly-shaped metal workpiece is the metal workpiece 90 having at least one friction stir weld 92 as shown in FIG. 9, which is described in more detail below. The first-hardened condition of the metal is the T4 condition when the metal workpiece is aluminum or an aluminum alloy.

The method 30 further includes performing 34 a second heat-treating process on the first-hardened metal workpiece to transition the first-hardened workpiece a second-hardened condition to produce a second-hardened metal workpiece. When the metal workpiece is aluminum or an aluminum alloy, the second-hardened condition is the T6 condition.

The method 30 further includes forming 36 the second-hardened metal workpiece into a shaped metal workpiece, with the shaped metal workpiece being in one of a near-finally-shaped metal workpiece or a finally-shaped workpiece. An example of the shaped metal workpiece is the metal workpiece 114*b*, 114*c*, 114*d*, 114*e* and 120 as shown in FIGS. 11B, 11C, 11D, 11E and FIG. 12, which is described in more detail below. According to aspects of the present disclosure, the shaped metal workpiece retains and includes the friction stir weld 92 introduced to the roughly-shaped metal workpiece as shown in FIG. 9. According to aspects of the present disclosure, in method 30, forming processes 36 used to transform a roughly-shaped metal workpiece into the shaped (i.e. near-finally-shaped or finally-shaped) metal workpiece includes subjecting the metal workpiece to super-plastic processes, super-plastic/diffusion bond processes, form-die processes, explosive-forming processes, and combinations thereof. As contemplated by method 30, all of the forming processes on the roughly shaped metal workpiece (e.g. forming the roughly-shaped metal workpiece into the shaped metal workpiece) may be completed while the metal is in the second-hardened condition.

Consistent with particular aspects of the present disclosure, FIG. 4 is directed to a method 40 for making a heat-treated structure formed of metal. Whereas FIGS. 1 and 2 outline methods, 10 and 20 respectively, where the roughly-shaped metal workpiece is formed into a shaped metal workpiece in the first-hardened condition, as shown in FIG. 4, a method 40 is further defined such that at least some forming of the metal workpiece into the shaped metal workpiece occurs after the metal workpiece is in the second-hardened condition. Further, as compared with the method 30 outlined in FIG. 3, in FIG. 4 the metal workpiece is formed into a near-finally-shaped and finally-shaped metal workpiece while the metal workpiece is in the second-hardened condition. The method 40 includes performing 32 a first heat-treating process on a roughly-shaped metal workpiece (with the workpiece in an annealed condition including at least one friction stir weld) to transition the roughly-shaped metal workpiece into a first-hardened condition to produce a first-hardened metal workpiece. One example of the roughly-shaped metal workpiece is the metal workpiece 90 having at least one friction stir weld 92 as shown in FIG. 9, which is described in more detail below. The first-hardened condition of the metal is the T4 condition when the metal workpiece is aluminum or an aluminum alloy.

The method 40 further includes performing 34 a second heat-treating process on the first-hardened metal workpiece to transition the first-hardened workpiece to a second-hardened condition to produce a second-hardened metal workpiece. When the metal workpiece is aluminum or an aluminum alloy, the second-hardened condition is the T6 condition.

Figure 11:
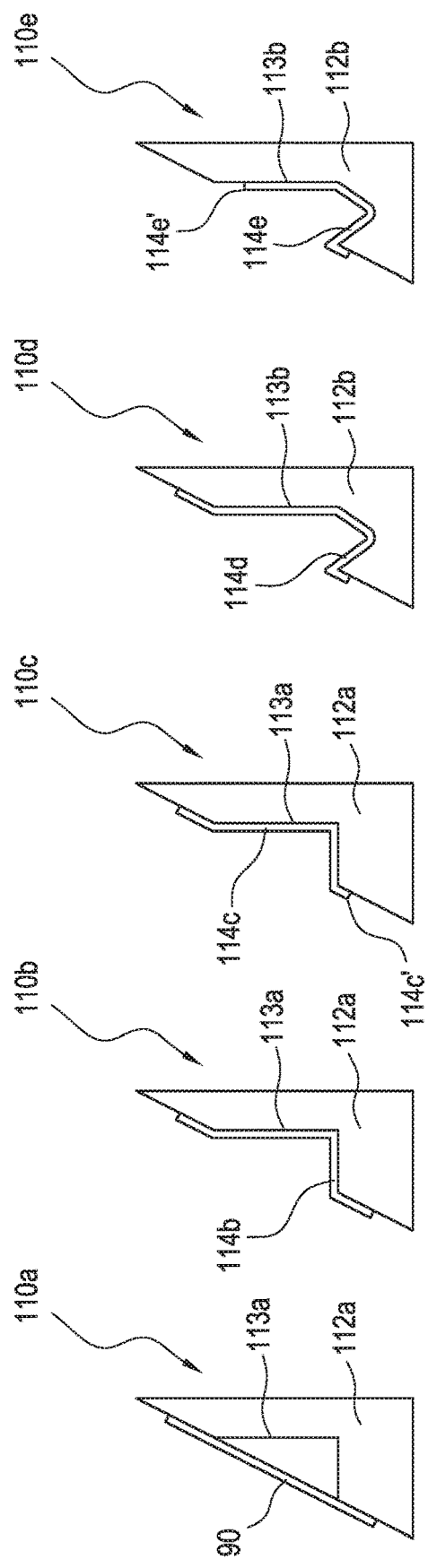

The method 40 further includes forming 37 the second-hardened metal workpiece into a near-finally-shaped metal workpiece. An example of a near-finally-shaped metal workpiece is the metal workpiece 114d as shown in FIG. 11D, which is described in more detail below. According to aspects of the present disclosure, the shaped metal workpiece retains and includes the friction stir weld 92 introduced to the roughly-shaped metal workpiece as shown in FIG. 9. According to aspects of the present disclosure, the method 40, in step 37 the forming processes used to transform a roughly-shaped metal workpiece into the near-finally-shaped metal workpiece includes subjecting the metal sheet to super-plastic processes, super-plastic/diffusion bond processes, form-die processes, explosive-forming processes, and combinations thereof.

The method 40 further includes forming 42 the near-finally shaped metal workpiece into the finally-shaped metal workpiece while the near-finally-shaped metal workpiece is in the second-hardened condition. According to aspects of the present disclosure, the method 40, forming processes 42 used to transform a roughly-shaped metal workpiece into the shaped (i.e. near-finally-shaped or finally-shaped) metal workpiece including subjecting the metal sheet to super-plastic processes, super-plastic/diffusion bond processes, form-die processes, explosive-forming processes, and combinations thereof. An example of the finally-shaped metal workpiece is the metal workpiece 114e and 120 as shown in FIG. 11E and FIG. 12, which is described in more detail below. As contemplated by method 40, all of the forming processes on the roughly shaped metal workpiece (e.g. forming the roughly-shaped metal workpiece into the near-finally-shaped metal workpiece and the finally-shaped metal workpiece) may be completed while the metal is in the second-hardened condition.

Consistent with particular aspects of the present disclosure, FIG. 5 is directed to a method 50 for making a heat-treated structure formed of metal. FIGS. 1 and 2 outline methods, 10 and 20 respectively, where the roughly-shaped metal workpiece is formed into a shaped metal workpiece in the first-hardened condition. Further, as compared with the method 30 outlined in FIG. 3, in FIG. 4 (method 30) and FIG. 5 (method 50) the metal workpiece is formed into a shaped (FIG. 5) or near-finally-shaped (FIG. 4) metal workpiece while the metal workpiece is in the second-hardened condition. FIG. 5 further specifies, in step 52, using a plurality of forming processes to form the shaped metal workpiece into a finally-shaped metal workpiece while in the second-hardened condition. The method 50 includes performing 32 a first heat-treating process on a roughly-shaped metal workpiece in an annealed condition (with the workpiece in an annealed condition including at least one friction stir weld) to transition the roughly-shaped metal workpiece into a first-hardened condition to produce a first-hardened metal workpiece. One example of the roughly-shaped metal workpiece is the metal workpiece 90 having at least one friction stir weld 92 as shown in FIG. 9, which is described in more detail below. The first-hardened condition of the metal is the T4 condition when the metal workpiece is aluminum or an aluminum alloy.

The method 50 further includes performing 34 a second heat-treating process on the first-hardened metal workpiece to transition the first-hardened workpiece to a second-hardened condition to produce a second-hardened metal workpiece. When the metal workpiece is aluminum or an aluminum alloy, the second-hardened condition is the T6 condition.

The method 50 further includes forming 36 the second-hardened metal workpiece into a shaped metal workpiece, with the shaped metal workpiece being in one of a near-finally-shaped metal workpiece or a finally-shaped workpiece. An example of the shaped metal workpiece is the metal workpiece 114b, 114c, 114d, 114e and 120 as shown in FIGS. 11B, 11C, 11D, 11E and FIG. 12, which is described in more detail below. According to aspects of the present disclosure, in method 50, forming processes 36 used to transform a roughly-shaped metal workpiece into the shaped (i.e., near-finally-shaped or finally-shaped) metal workpiece includes subjecting the metal workpiece to super-plastic processes, super-plastic/diffusion bond processes, form-die processes, explosive-forming processes, and combinations thereof. As contemplated by method 50, all of the forming processes on the roughly shaped metal workpiece (e.g., forming the roughly-shaped metal workpiece into the shaped metal workpiece) may be completed while the metal is in the second-hardened condition.

The method 50 further includes using 52 a plurality of forming processes to form the shaped metal workpiece into the finally-shaped metal workpiece while the shaped metal workpiece is in the second-hardened condition, with the forming processes set forth above for use in step 36 also contemplated as available forming methods in step 52. An example of the finally-shaped metal workpiece is the metal workpiece 114e and 120 as shown in FIG. 11E and FIG. 12, which is described in more detail below.

Consistent with particular aspects of the present disclosure, FIG. 6 is directed to a method 60 for making a heat-treated structure formed of metal. Method 60 is similar to method 50 outlined in FIG. 50, but includes forming 62 a metal sheet into a roughly-shaped metal workpiece including a friction stir weld, while the metal sheet is in the annealed condition. One example of the roughly-shaped metal workpiece is the metal workpiece 90 having at least one friction stir weld 92 as shown in FIG. 9, which is described in more detail below. The roughly-shaped state of the metal workpiece, according to aspects of the present disclosure, therefore contemplates the state of the metal work-piece between the initial form of a metal (e.g. a metal sheet that may be substantially planar) and a shaped (i.e. near-finally-shaped, or finally-shaped) metal workpiece that has been subjected to subsequent forming processes after attaining the roughly-shaped metal workpiece.

The method 60 further includes performing 32 a first heat-treating process on the roughly-shaped metal workpiece in an annealed condition (with the workpiece in an annealed condition comprising at least one friction stir weld)

to transition the roughly-shaped metal workpiece into a first-hardened condition to produce a first-hardened metal workpiece. The first-hardened condition of the metal is the T4 condition when the metal workpiece is aluminum or an aluminum alloy.

The method 60 further includes performing 34 a second heat-treating process on the first-hardened metal workpiece to transition the first-hardened workpiece a second-hardened condition to produce a second-hardened metal workpiece. When the metal workpiece is aluminum or an aluminum alloy, the second-hardened condition is the T6 condition.

The method 60 further includes forming 36 the second-hardened metal workpiece into a shaped metal workpiece, with the shaped metal workpiece being in one of a near-finally-shaped metal workpiece or a finally-shaped workpiece. An example of the shaped metal workpiece is the metal workpiece 114b, 114c, 114d, 114e and 120 as shown in FIGS. 11B, 11C, 11D, 11E and FIG. 12, which is described in more detail below. According to aspects of the present disclosure, the forming processes in the method 60 used to transform a roughly-shaped metal workpiece into the shaped (i.e. near-finally-shaped or finally-shaped) metal workpiece includes subjecting the metal sheet to super-plastic processes, super-plastic/diffusion bond processes, form-die processes, explosive-forming processes, and combinations thereof.

Method 60 further includes using 52 a plurality of forming processes to form the near-finally shaped metal workpiece into the finally-shaped metal workpiece while the near-finally-shaped metal workpiece is in the second-hardened condition, with the forming processes set forth above for use in step 36 also contemplated as available forming methods in step 52. An example of the finally-shaped metal workpiece is the metal workpiece 114e and 120 as shown in FIG. 11E and FIG. 12, which is described in more detail below.

Consistent with particular aspects of the present disclosure, FIG. 7 is directed to a method 70 for making a heat-treated structure formed of metal. The method 70 described in FIG. 7 is similar to the method outlined in FIG. 1, except the method 70 contemplates 72 performing at least one age-hardening process on the roughly-shaped metal workpiece in the first-hardened condition, and performing 74 at least one age-hardening process on the shaped metal workpiece in the second-hardened condition. Method 70 therefore includes forming 12 a metal sheet into a roughly-shaped metal workpiece having a friction stir weld while the metal sheet is in an annealed condition. Step 12 is performed in a manner consistent with aspects of the present disclosure using forming processes including forming processes such as rolling or other physical shaping means suitable to physically transform and shape a metal from a first, or initial, orientation to a subsequent orientation. Further forming processes to transform metal to a roughly-shaped metal workpiece, as contemplated by aspects of the present disclosure, may take place in step 12 including subjecting the metal sheet to super-plastic processes, super-plastic/diffusion bond processes, form-die processes, explosive-forming processes, and combinations thereof. One example of the roughly-shaped metal workpiece is the metal workpiece 90 having at least one friction stir weld 92 as shown in FIG. 9, which is described in more detail below. The roughly-shaped state of the metal workpiece, according to aspects of the present disclosure, therefore contemplates the state of the metal workpiece between the initial form of a metal (e.g., a metal sheet that may be substantially planar) and a shaped (i.e. near-finally-shaped, or finally-shaped) metal workpiece that has been subjected to subsequent forming processes after attaining the roughly-shaped metal workpiece.

Method 70 further includes performing 14 a first heat-treating process on the roughly-shaped metal workpiece to transition the roughly-shaped metal workpiece from an annealed condition comprising at least one friction stir weld to produce a first-hardened condition, with the roughly-shaped metal workpiece comprising at least one friction stir weld. When the metal workpiece is aluminum or an aluminum alloy, the first-hardened condition is the T4 condition.

The method 70 further includes performing 72 at least one age-hardening process on the roughly-shaped metal workpiece in the first-hardened condition. When the metal workpiece is aluminum or an aluminum alloy and the first-hardened condition is the T4 condition, the age-hardening process can be a natural aging process to age the metal workpiece to a stable condition.

The method 70 further includes forming 16 the roughly-shaped metal workpiece into a shaped metal workpiece while the roughly-shaped metal workpiece is in the first-hardened condition. The shaped metal workpiece is one of a near finally-shaped metal workpiece or a finally-shaped metal workpiece. An example of the shaped metal workpiece is the metal workpiece 114b, 114c, 114d, 114e and 120 as shown in FIGS. 11B, 11C, 11D, 11E and FIG. 12, which is described in more detail below. According to aspects of the present disclosure, in step 16 the forming processes used to transform a roughly-shaped metal workpiece into the shaped (i.e. near-finally-shaped or finally-shaped) metal workpiece includes subjecting the metal sheet to super-plastic processes, super-plastic/diffusion bond processes, form-die processes, explosive-forming processes, and combinations thereof.

Method 70 further includes performing 18 a second heat-treating process on the shaped workpiece to transition the shaped metal workpiece from the first-hardened condition to produce a second-hardened condition. When the metal workpiece is aluminum or an aluminum alloy, the second-hardened condition is the T6 condition.

The method 70 further includes performing 74 at least one age-hardening process on the shaped metal workpiece in the second-hardened hardened condition. When the metal workpiece is aluminum or an aluminum alloy and the second-hardened condition is the T6 condition, the age-hardening process can be an artificial aging process to age the metal workpiece to achieve precipitation hardening.

At least one forming process can be performed while the metal is in the second-hardened condition. However, all of the forming processes on the roughly-shaped workpiece (e.g. forming the roughly-shaped metal workpiece into the shaped metal workpiece) may be completed while the metal is in the first-hardened condition.

FIGS. 8A, 8B and 8C show a series in progression of exemplary drawings illustrating how a workpiece may be formed during an explosive forming process that can be used in the forming processes 16, 24, 36, 37, 42, and 52. According to explosive forming assembly 80a, a tank 82 contains an amount of water 83. A die 84 defines a cavity 85 and a vacuum line 87 extends from the cavity 85 through the die 84 to a vacuum (not shown). Workpiece 86a is held in position in the die 84 via a hold-down ring or other retaining device (not shown). An explosive charge 88 is shown suspended in the water 83 via a charge detonation line 89, with charge detonation line 19a connected to a detonator (not shown). As shown in FIG. 8B, the charge 88 (shown in FIG. 8A) has been detonated in explosive forming assembly 80b creating a shock wave "A" emanating from a gas bubble "B", with the shock wave "A" causing the deformation of the workpiece 86b into cavity 85 until the workpiece 86c is driven against (e.g., immediately proximate to and in contact with) the inner surface of die 84 as shown in FIG. 8C.

Consistent with particular aspects of the present disclosure, FIG. 9 is a perspective drawing of a metal workpiece 90 in an annealed condition and, for the purpose of the present disclosure, in a roughly-shaped condition or state. As shown in FIG. 9, workpiece 90 has been shaped into a substantially frusto-conical shape. Friction stir welds 92 are shown in workpiece 90, and are introduced into the metal workpiece before, after and/or during the forming of the metal workpiece into the roughly-shaped condition. While friction stir welds are shown, the present disclosure contemplates any welds that collectively can be referred to as "fly away" welds as described herein. As shown, workpiece 90 is a metal workpiece that is preferably made from aluminum or an aluminum alloy or alloys. Workpiece 90 can be shaped into the frusto-conical orientation by forming processes, including forming processes such as rolling or other physical shaping means suitable to physically transform and shape a metal from a first, or initial, orientation (e.g. a metal sheet) to a subsequent roughly-shaped orientation, such as shown in FIG. 9.

Consistent with particular aspects of the present disclosure, FIG. 10 is a perspective view of a forming station 100. As shown in FIG. 10, workpiece 90 is introduced into forming block 102 that has a forming block cavity 104. The forming station 100 is non-specific as to any particular forming process that can be used to shape metal workpieces. Representative forming processes include forming processes used to transform a roughly-shaped metal workpiece into the shaped (i.e. near-finally-shaped or finally-shaped) metal workpiece such as super-plastic processes, super-plastic/diffusion bond processes, form-die processes, explosive-forming processes (such as the process shown in FIGS. 8A-8C), and combinations thereof, and include a forming block or die against which, by a force, a metal workpiece can be driven to achieve a predetermined shape.

Consistent with particular aspects of the present disclosure, FIGS. 11A, 11B, 11C, 11D and 11E are cross-sectional side views showing a section of a workpiece within forming blocks, and showing the progressive forming and shaping of a workpiece from a roughly-shaped workpiece 90 as shown in FIGS. 9 and 10 into a near-finally and/or finally-shaped workpiece.

FIG. 11A shows a cross-sectional side view of forming block 102 taken across line "A" of forming block 102 as shown in FIG. 10. FIG. 11A, in step 110a, shows cross-section of roughly-shaped metal workpiece 90 resting within the cavity of forming block 112a (a cross-section of forming block 102 taken along line "A" as shown in FIG. 10). After workpiece 90 has been exposed to at least one forming process, FIG. 11B shows step 110b, wherein roughly-shaped metal workpiece 90 is now shown as 114b having been shaped such that the roughly-shaped metal workpiece rests substantially proximate to the wall 113a of cavity 115. The roughly-shaped workpiece 90 is thus transformed into shaped workpiece 114b. Shaped workpiece 114c is shown as having been further shaped as compared to the shaped workpiece 114b shown in FIG. 11B.

As shown in FIG. 11C, shaped workpiece 114b has been further shaped into workpiece 114c by trimming workpiece end 114c' of workpiece 114c. FIG. 11D shows a second forming block 112b having a wall 113b with a contour that is different from the contour of wall 113a of forming block 112a. The wall 113b defines a cavity of the second forming block 112b. In this way, forming block 112b has a different cavity configuration as compared to the cavity of forming block 112a. As shown in step 110c, the workpiece 114c has now been subjected to a further forming process and further shaped into a workpiece configuration shown as workpiece 114d. FIG. 11E shows step 110e wherein workpiece 114d has been further shaped by a further forming process followed by a trimming operation to shape workpiece end 114e' of workpiece 114e. According to aspects of the present disclosure, workpieces 90, 114b, and 114c can be considered to be a roughly-shaped workpiece, while workpieces 114d and 114e are shown to be a nearly-finally shaped workpiece. In further aspects, workpieces 114d and/or 114e may be considered to be finally-shaped workpieces, depending upon the desired and predetermined configuration of the workpiece according to the final workpiece configuration needed in use. According to further aspects (not shown) additional forming steps may be used, requiring additional forming blocks, if desired.

FIG. 12 is a perspective view of a nacelle lipskin according to an aspect of the present disclosure. As shown in FIG. 12, a lipskin 120 is fabricated according to methods disclosed herein, and ready for installation to an aircraft engine nacelle 132 on an aircraft 130 as shown in FIG. 13.

According to aspects of the present disclosure, the forming processes are conducted while the metal workpiece is in the first-hardened condition. The present disclosure further contemplates aspects where some of the forming processes may be conducted while the metal workpiece is in the second-hardened condition. However, such forming of the workpiece in the second-hardened condition will be finished forming and shaping; in some cases modifying the metal workpiece less than about 3% of the forming conducted on the metal workpiece as compared with the forming conducted on the workpiece when the workpiece is in conditions other than the second-hardened condition. The present disclosure therefore contemplates forming the metal workpiece via forming processes conducted: 1) in the annealed and first-hardened conditions; 2) in the annealed and in either the first-hardened or second-hardened conditions; and 3) in the annealed and both the first-hardened and second-hardened conditions.

According to aspects of the present disclosure, friction stir welds that are incurred in the metal workpieces produced according to the methods presented herein are retained in the near-finally-shaped and/or finally-shaped metal workpieces. In other words, the friction stir weld(s) made in the metal workpieces are not removed in finishing steps. As a result, the need for couplers or other reinforcing component parts (e.g. rivets, fasteners, etc.) is obviated according to aspects of the present disclosure.

Aspects of the present disclosure may, of course, be carried out in other ways than those specifically set forth herein without departing from essential characteristics of the aspects presented herein. The present aspects are to be considered in all respects as illustrative and not restrictive, and all changes coming within the meaning and equivalency range of the appended claims are intended to be embraced therein.

What is claimed is:

1. A method for making a heat-treated structure formed of metal, the method comprising:
    performing a first heat-treating process on a metal workpiece in an annealed condition, to transition the metal workpiece from an annealed condition to a first-hardened condition, said metal workpiece comprising at least one friction stir weld;

forming the metal workpiece into a shaped metal workpiece while the metal workpiece is in the first-hardened condition; and performing a second heat-treating process on the shaped metal workpiece to transition the shaped metal workpiece from the first-hardened condition to a second-hardened condition.

2. The method according to claim 1, wherein forming the metal workpiece into the shaped metal workpiece comprises using at least one forming process to shape the metal workpiece into the shaped metal workpiece.

3. The method according to claim 1, the method further comprising:

forming the shaped metal workpiece into the finally-shaped metal workpiece while shaped metal workpiece is in the second-hardened condition.

4. The method according to claim 1, the method further comprising:

using a plurality of forming processes to shape the metal workpiece into the finally-shaped metal workpiece.

5. The method according to claim 1, wherein the forming process is selected from the group consisting of: a super-plastic forming process; a super-plastic/diffusion bond forming process; a form-die forming process; an explosion forming process; and combinations thereof.

6. The method according to claim 1, wherein the steps of performing the first heat-treating process and second heat-treating process further comprise:

performing at least one age-hardening process on the metal workpiece in the first-hardened condition;

performing at least one age-hardening process on the shaped metal workpiece in the second-hardened condition; and wherein the first-hardened condition comprises a first age-hardened condition, and the second-hardened condition comprises a second age-hardened condition.

7. The method according to claim 1, wherein the step of performing the first heat-treating process comprises:

solution heat-treating the metal and natural aging the metal workpiece.

8. The method of claim 1, wherein performing a second heat-treating process comprises:

performing an artificial aging process on the shaped metal workpiece.

9. The method of claim 1, wherein performing a second heat-treating process comprises:

performing a solution heat-treating process on the shaped metal workpiece; and performing an artificial aging process on the shaped metal workpiece.

10. The method according to claim 1, wherein forming the metal workpiece into a shaped workpiece comprises:

using at least one forming process selected from the group consisting of:

a super-plastic forming process; a super-plastic/diffusion bond forming process; a form-die forming process; an explosion forming process; and combinations thereof.

11. The method according to claim 1, the method further comprising:

forming the near finally shaped metal workpiece into a finally-shaped metal workpiece while the near finally shaped metal workpiece is in the second-hardened condition.

12. The method according to claim 1, wherein the shaped metal workpiece is a finally-shaped metal workpiece and further comprising:

forming the metal workpiece into the finally-shaped metal workpiece using at least one forming process selected from the group consisting of: a super-plastic forming process; a super-plastic/diffusion bond forming process; a form-die forming process; an explosion forming process; and combinations thereof.

13. The method according to claim 1, further comprising:

using a plurality of forming processes to shape the metal workpiece, said plurality of forming processes selected from the group consisting of: a super-plastic forming process; a super-plastic/diffusion bond forming process; a form-die forming process; an explosion forming process; and combinations thereof.

14. The method according to claim 1, wherein the shaped metal workpiece comprises a friction stir weld.

15. The method according to claim 1, further comprising:

using a plurality of forming processes to shape the metal workpiece into the finally-shaped metal workpiece, said plurality of forming processes selected from the group consisting of: a super-plastic forming process; a super-plastic/diffusion bond forming process; a form-die forming process; an explosion forming process; and combinations thereof.

16. The method according to claim 1, further comprising the step of using at least one explosion forming process on the shaped metal workpiece in the second hardened condition.

17. The method according to claim 1, wherein, before the step of performing a first heat-treating process on a metal workpiece, further comprising:

forming a metal sheet into the metal workpiece while the metal sheet is in the annealed condition.

18. The method according to claim 17, wherein the step of forming a metal sheet further comprises:

rolling the metal sheet into the metal workpiece.

19. The method according to claim 17, wherein the step of forming the metal sheet further comprises:

forming the metal sheet, while the metal sheet is in the annealed condition, said forming process selected from the group consisting of: a super-plastic forming process; a super-plastic/diffusion bond forming process; a form-die forming process; an explosion forming process; and combinations thereof.

20. The method according to claim 17, further comprising:

forming the metal sheet into the metal workpiece while the metal sheet is in the annealed condition; and forming the sheet into a conical metal workpiece or a frusto-conical metal workpiece.

* * * * *

UNITED STATES PATENT AND TRADEMARK OFFICE
CERTIFICATE OF CORRECTION

PATENT NO. : 10,766,626 B2  
APPLICATION NO. : 15/603899  
DATED : September 8, 2020  
INVENTOR(S) : Luis R. Leon et al.

Page 1 of 1

It is certified that error appears in the above-identified patent and that said Letters Patent is hereby corrected as shown below:

In the Claims

In Column 18, Line 3, in Claim 11, delete "the near finally shaped" and insert --the shaped--, therefor;

In Column 18, Lines 4-5, in Claim 11, delete "the near finally shaped" and insert --the shaped--, therefor.

Signed and Sealed this  
Tenth Day of November, 2020

Andrei Iancu  
*Director of the United States Patent and Trademark Office*